(12) United States Patent
Andrade et al.

(10) Patent No.: US 8,997,039 B2
(45) Date of Patent: Mar. 31, 2015

(54) INJECTING A FAULT INTO A STREAM OPERATOR IN A DATA STREAM PROCESSING APPLICATION

(71) Applicant: International Business Machines Corporation, Armonk, NY (US)

(72) Inventors: Henrique Andrade, Croton-on-Hudson, NY (US); Bugra Gedik, Ankara (TR); Gabriela Jacques da Silva, Brooklyn, NY (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/867,595

(22) Filed: Apr. 22, 2013

(65) Prior Publication Data
US 2013/0238936 A1 Sep. 12, 2013

Related U.S. Application Data

(63) Continuation of application No. 12/748,633, filed on Mar. 29, 2010, now Pat. No. 8,458,650.

(51) Int. Cl.
*G06F 9/44* (2006.01)
*G06F 11/28* (2006.01)
*G06F 11/36* (2006.01)

(52) U.S. Cl.
CPC ............ *G06F 11/28* (2013.01); *G06F 11/3612* (2013.01); *G06F 11/3616* (2013.01)
USPC ............................ 717/106; 717/124; 717/131

(58) Field of Classification Search
None
See application file for complete search history.

(56) References Cited

U.S. PATENT DOCUMENTS

| | | | |
|---|---|---|---|
| 5,561,762 A * | 10/1996 | Smith et al. ..................... | 714/33 |
| 6,154,877 A | 11/2000 | Ramkumar et al. | |
| 6,401,216 B1 | 6/2002 | Meth et al. | |
| 6,671,821 B1 | 12/2003 | Castro et al. | |
| 6,999,432 B2 | 2/2006 | Zhang et al. | |
| 7,331,000 B2 * | 2/2008 | Ohno et al. ..................... | 714/20 |
| 7,409,676 B2 * | 8/2008 | Agarwal et al. ............... | 717/120 |
| 7,430,610 B2 | 9/2008 | Pace et al. | |
| 7,467,333 B2 * | 12/2008 | Keeton et al. ................... | 714/41 |
| 7,500,170 B2 * | 3/2009 | Wiatrowski et al. .......... | 714/758 |
| 7,536,595 B1 * | 5/2009 | Hiltunen et al. ................ | 714/26 |

(Continued)

OTHER PUBLICATIONS

"Understanding Large System Failures—A Fault Injection Experiment"—Ram Chillarege, et al. Published in: IEEE Fault-Tolerant Computing, 1989. FTCS-19. Digest of Papers., Nineteenth International Symposium on Date of Conference: Jun. 21-23, 1989, pp. 356-363.*

(Continued)

*Primary Examiner* — Don Wong
*Assistant Examiner* — Hossain Morshed
(74) *Attorney, Agent, or Firm* — William Stock

(57) ABSTRACT

In one embodiment, the invention comprises partial fault tolerant stream processing applications. One embodiment of a method for implementing partial fault tolerance in a stream processing application comprising a plurality of stream operators includes: defining a quality score function that expresses how well the application is performing quantitatively, injecting a fault into at least one of the plurality of operators, assessing an impact of the fault on the quality score function, and selecting at least one partial fault-tolerant technique for implementation in the application based on the quantitative metric-driven assessment.

23 Claims, 11 Drawing Sheets

(56) References Cited

U.S. PATENT DOCUMENTS

| | | | |
|---|---|---|---|
| 7,945,820 B2* | 5/2011 | Kaefer et al. | 714/57 |
| 7,983,929 B2* | 7/2011 | Zimmerman | 705/1.1 |
| 8,458,650 B2 | 6/2013 | Andrade et al. | |
| 8,631,094 B1 | 1/2014 | Alpert et al. | |
| 2005/0034014 A1 | 2/2005 | Moser et al. | |
| 2006/0004860 A1 | 1/2006 | Liedes et al. | |
| 2006/0123387 A1* | 6/2006 | Shim et al. | 717/100 |
| 2009/0213854 A1 | 8/2009 | Menendez | |
| 2009/0299713 A1* | 12/2009 | Miller et al. | 703/8 |
| 2010/0287535 A1* | 11/2010 | Kim et al. | 717/127 |
| 2010/0293532 A1 | 11/2010 | Andrade et al. | |
| 2011/0239048 A1 | 9/2011 | Andrade et al. | |

OTHER PUBLICATIONS

"Fault Tolerance versus Performance Metrics for Robot System"—Deirdre L. Hamilton, et al. D.L. Hamilton, I.D. Walker, J.K Bennett Fault tolerance versus performance metrics for robot systems, in Proc. IEEE Conf. on Robotics and Automation, pp. 3073-3080, 1996.*

"A Method and Tool Support for Model-based Semi-automated Failure Modes and Effects Analysis of Engineering Designs" David Parker et al. (ACM 2004 article) Published in: Proceeding SCS '04 Proceedings of the 9th Australian workshop on Safety critical systems and software—vol. 47, pp. 89-95.*

"Towards Optimal Resource Allocation in Partial-Fault Tolerant Application", Nikhil Basal et al. IEEE INFOCOM 2008.*

Agrawal et al., article title, "Supporting fault-tolerance in streaming grid applications", published in IEEE International Symposium 2008.*

Hamilton et al. Article Title, "Fault tolerance versus performance metrics for robot systems", in Proc. IEEE Conf. on Robotics and Automation, pp. 3073-3080, 1996.*

Chillarege et al., Published in: IEEE, Fault-Tolerant Computing, 1989. FTCS-19. Digest of Papers, Nineteenth International Symposium on Date of Conference: Jun. 21-23, 1989, pp. 356-363.*

Bansal et al., Article Title, "Towards Optimal Resource Allocation in Partial-Fault Tolerant Applications", IEEE Infocom 2008 proceedings.*

Parker et al., Article title, "A method and tool support for model-based semi-automated failure modes and effects analysis of engineering designs", Published by Australian Computer Society, ACM 2004 article, Published in: Proceeding, SCS '04 Proceedings of the 9th Australian workshop on Safety critical systems and software—vol. 47, pp. 89-95.*

Parker et al., Article Title: "A Method and Tool Support for Model-based Semi-automated Failure Modes and Effects Analysis of Engineering Designs", This paper appeared at the 9th Australian Workshop on Safety Related Programmable Systems (SCS'04), Copyright © 2004, Australian Computer Society.*

"Clan Zhu Liang Chen Gagan Agrawal","Supporting Fault-Tolerance in Streaming Grid Applications"; : Apr. 14-18, 2008;"Dept. of Comput. Sci. & Eng., Ohio State Univ., Columbus, Oh.";"12 pages".

Greg Bronevetsky, Daniel Marques, Keshav Pingali, Paul Stodghill;"Automated Application-level Checkpointing of MPI Programs";"Oct. 10, 2003";"ACM New York","vol. 38";"11 Pages".

Mattan Erez et al., "Fault Tolerance Techniques for the Merrimac Streaming Supercomputer," Conference on High Performance Networking and Computing, Proceedings of the 2005 ACM/IEEE conference on Supercomputing, 2005.

Youngsu Chae, et al., "Silo, Rainbow, and Caching Token: Schemes for Scalable, Fault Tolerant Stream Caching," IEEE Journal on Selected Areas in Communications, vol. 20, No. 7, Sep. 2002. pp. 1328-1344.

Gerard J.M. Smit et al., "Multi-core Architectures and Streaming Applications," *SLIP '08*, Apr. 5-6, 2008, Newcastle, United Kingdom, Copyright 2008 ACM, pp. 35-42.

Nesime Tatbul, "Staying FIT: Efficient Load Shedding Techniques for Distributed Stream Processing," *VLDB '07*, Sep. 23-28, 2007, Vienna, Austria, Copyright 2007 VLDB Endowment, pp. 159-170.

Jean Arlat, et al., "Fault Injection for Dependability Validation: A Methodology and Some Applications," IEEE Transactions on Software Engineering, vol. 16, No. 2, Feb. 1999, pp. 166-182.

Diamantino Costa, at al., "Joint Evaluation of Performance and Robustness of a COTS DBMS through Fault-Injection," Proceedings of the 2000 International Conference on Dependable Systems and Networks, 2000, consists of 10 unnumbered pages.

Mei-Chen Hsueh, et al., "Fault Injection Techniques and Tools," *Computer*, vol. 30, No. 4, pp. 75-82, Apr. 1997.

Office Action dated Aug. 14, 2012 re: U.S. Appl. No. 12/748,633.

* cited by examiner

| Operator | Outage duration impact | Data dependency | Quality impact | Recovery time |
|---|---|---|---|---|
| Source | -0.38 | 0.21 | 21.27 | 340 |
| TradeFilter | 0.97 | 0.76 | 48.72 | 340 |
| QuoteFilter | -1.00 | 0.00 | 7.00 | 6 |
| VWAP | 0.99 | 0.14 | 30.88 | 73 |
| BargainIndex | -0.69 | 0.08 | 7.91 | 43 |

FIG. 9

INJECTING A FAULT INTO A STREAM OPERATOR IN A DATA STREAM PROCESSING APPLICATION

CROSS REFERENCE TO RELATED APPLICATIONS

This application is a continuation of co-pending U.S. patent application Ser. No. 12/748,633, filed Mar. 29, 2010, which is herein incorporated by reference in its entirety.

REFERENCE TO GOVERNMENT FUNDING

This invention was made with Government support under Contract No. H98230-07-C-0383, awarded by the United States Department of Defense. The Government has certain rights in this invention.

BACKGROUND OF THE INVENTION

The present invention relates generally to component-based applications, and relates more specifically to the deployment of fault tolerance techniques in stream processing applications (a particular type of component-based application).

The stream processing paradigm is employed to analyze streaming data (e.g., audio, sensor readings and news feeds, financial transactions, and events from manufacturing plants, telecommunications plants, or water distribution systems, among others) in real time. An example of a stream processing system is the INFOSPHERE STREAMS middleware commercially available from International Business Machines Corporation of Armonk, N.Y., which runs applications written in the Streams Processing Language (SPL) programming language.

High availability is critical to stream processing systems, since they process continuous live data. Developers build streaming applications by assembling stream operators as data flow graphs, which can be distributed over a set of nodes to achieve high performance and scalability. A fault in a computing node or in a stream operator can result in massive data loss due to the typical high data rates of incoming streams.

While many fault tolerance techniques for stream computing guarantee no data loss, partial fault tolerance techniques aim to reduce the performance impact imposed by the additional logic required for ensuring application reliability by assuming that a certain amount of stream data loss and duplication (i.e., multiple delivery of the same data item) between stream operators is acceptable under faulty conditions. Partial fault tolerance techniques avoid full replication of the stream processing graph, either by replicating only part of its components, or by avoiding checkpointing the whole state of the application (i.e., the internal state of the stream operators and the state of the communication channels). The rationale is that many streaming applications tolerate data imprecision by design, and, as a result, can still operate under data loss or duplication.

Although more efficient resource-wise than techniques that guarantee no data loss, partial fault tolerance is not viable without a clear understanding of the impact of faults in the application output.

SUMMARY OF THE INVENTION

In one embodiment, the invention comprises partial fault tolerant stream processing applications. One embodiment of a method for implementing partial fault tolerance in a stream processing application comprising a plurality of stream operators includes: defining a quality score function that expresses how well the application is performing quantitatively, injecting a fault into at least one of the plurality of operators, assessing an impact of the fault on the quality score function, and selecting at least one partial fault-tolerant technique for implementation in the application based on that assessment.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 9 is a chart illustrating sample values for each of the four metrics assessed for several of the operators illustrated in FIG. 8;

DETAILED DESCRIPTION

Figure 1:
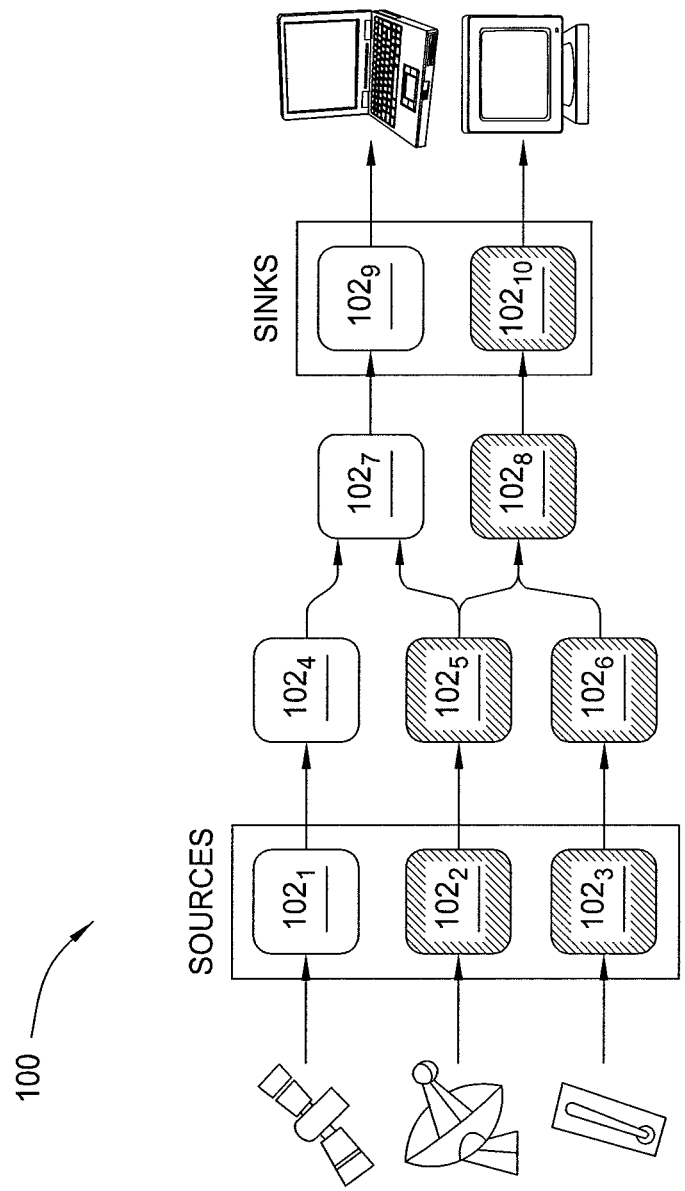
FIG. 1 is a schematic diagram illustrating an exemplary streaming application that may be adapted to benefit from the present invention.

In one embodiment, the invention comprises partial fault tolerant stream processing applications. Embodiments of the invention evaluate the behavior of partial fault tolerance in a streaming application subjected to runtime faults. Further embodiments of the invention use fault injection to mimic the effect of a fault in a streaming application when a specific partial fault tolerance mechanism is in place. It is assumed that a fault detector and a fault tolerance mechanism are in place and have been validated.

Streaming applications produce results continually. As a result, the output of a streaming application should be carefully analyzed so that a precise understanding of the impact of faults on the application output can be obtained. In one embodiment, the impact of faults on the application output is assessed by establishing four metrics. These metrics characterize how each stream operator of an application behaves under faults when a certain partial fault tolerance mechanism is in place. By computing these metrics for each operator in the flow graph, the application developer can determine whether the tested partial fault tolerance technique is adequate for the application. Additionally, the metrics can be used to understand which operators are most critical with respect to the application output quality (e.g., disturb the output the most). In one embodiment, highly critical operators are given priority when protecting an application in the presence of a limited resource budget for fault tolerance.

Embodiments of the present invention can be deployed using the SPL programming language and within the context of the INFOSPHERE STREAMS distributed stream processing middleware application, commercially available from the International Business Machines Corporation of Armonk, N.Y. Although embodiments of the invention are discussed within the exemplary context of the INFOSPHERE STREAMS middleware application and the SPL programming language framework, those skilled in the art will appreciate that the concepts of the present invention may be advantageously implemented in accordance with substantially any type of distributed computing framework and with any programming language.

Partial fault tolerance techniques cannot guarantee perfect application output under faulty conditions, unlike techniques that ensure no data loss and no duplication. Different partial fault tolerance mechanisms have different effects on the input/output stream of a failed operator and, as a result, on the application output. A stream operator may fail (i.e., stop executing its operations or communicating with other system components) for any one or more of several reasons, including, but not limited to: a heisenbug (i.e., a computer bug that disappears or alters its characteristics when an attempt is made to study it) in the component implementation (e.g., a timing error), a node failure (e.g., a power outage), an operating system kernel failure (e.g., a device driver crashes and forces a machine reboot), a transient hardware fault (e.g., a memory error corrupts an application variable and causes the stream processing application to crash), or a network failure (e.g., the network cable gets disconnected, and no other node can send data to components in the unreachable node).

FIG. 1 is a schematic diagram illustrating an exemplary streaming application 100 that may be adapted to benefit from the present invention. As illustrated, the application 100 comprises a total of ten stream operators $102_1$-$102_{10}$ (hereinafter collectively referred to as "operators 102"). The application 100 may include multiple independent inputs (called "sources") and multiple independent outputs (called "sinks"). In the illustrated case, the application 100 includes three different sources $102_1$-$102_3$, which are processed to generate the results output by two different sinks $102_9$-$102_{10}$, where each sink stores the result of a different computation over the incoming data. As illustrated, streaming applications may have multiple independent sinks, such that parts of the data flow graph are re-used for a different computation over the same input streams (e.g., by using different statistical models).

As discussed above, embodiments of the invention systematically inject faults into a streaming application and evaluate the impact of these faults on different stream operators involved in the computation of the results output by a specific sink. The impact of a stream operator failure is evaluated by computing different metrics that use an application-specific quality score function and comparing the results of the quality score function to the results of the same function applied over fault-free runs of the streaming application.

In one embodiment, a fault injection framework is built to assess the impact of partial fault tolerance by emulating the effect of the partial fault tolerance techniques on the input/output streams of a target stream operator. This framework includes fault models that emulate the possible effects caused by the use of partial fault tolerance (e.g., bursty tuple loss, duplication, and re-ordering, among others). One embodiment of the invention focuses on the bursty tuple loss fault model, which emulates an operator crash-and-restore from a checkpoint, but does not save in-flight tuples during failure detection and recovery time.

The framework is built to work seamlessly with the INFOSPHERE STREAMS middleware and the SPL programming language, but its design principles can be applied by other stream processing frameworks and languages. The framework includes specific types of stream operators that mimic the faulty behavior of an operator when subjected to specific faults.

Figure 2:
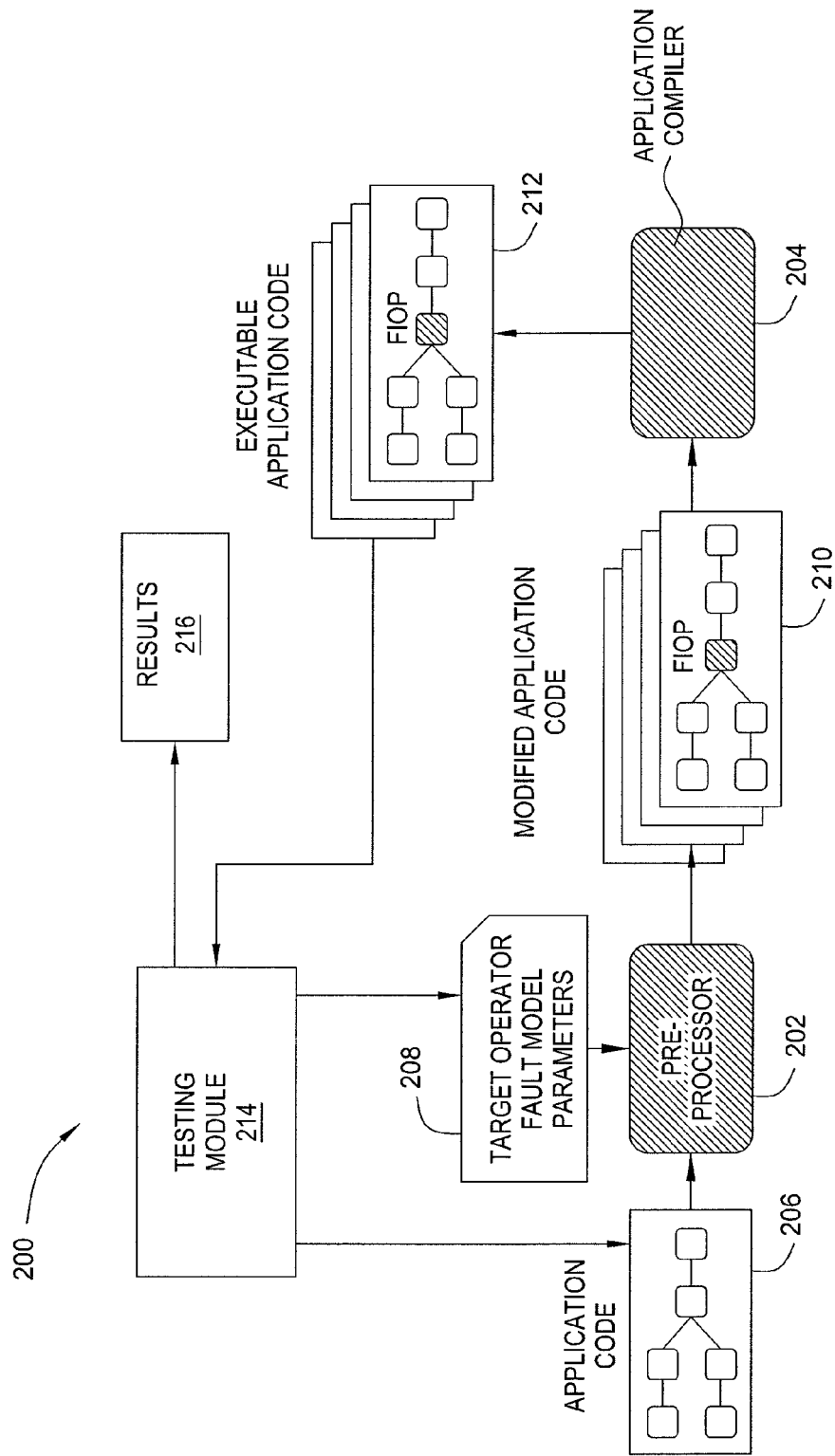
FIG. 2 is a schematic diagram illustrating one embodiment of a system for testing a streaming application by injecting faults, according to the present invention.

FIG. 2 is a schematic diagram illustrating one embodiment of a system 200 for testing a streaming application by injecting faults, according to the present invention. As illustrated, the main components of the system are a pre-processor 202 an application compiler 204, and a testing module 214. Any one or more of these components may be part of a larger computing device (e.g., a general purpose computing device configured to test and design streaming applications), or each component may comprise a stand-alone device.

The preprocessor 202 receives as input: (1) stream processing application code 206 for a target application (written, e.g., in SPL, and represented as its data flow graph in FIG. 2); and (2) a set 208 of testing data (including, for example, a target stream operator, a fault model, and injection parameters for the fault model). In one embodiment, these inputs are received from the testing module 214. Based on the target operator and the fault model, the preprocessor 202 modifies the original program code to include the fault injection operator (FIOP) in its corresponding position on the data flow graph of the application. The FIOP comprises specialized logic that emulates the effects of a failure. For example, if the fault model requires the emulation of a tuple drop behavior at the input ports of an operator, all of the operators connected to these input ports are re-routed to send their output streams to the FIOP. The FIOP is then connected to the target operator.

The preprocessor 202 generates multiple modified programs 210 based on the new data flow graph, each program including a FIOP configured with a different one of the fault injection parameters. The preprocessor 202 outputs the modified programs 210 to the application compiler 204. The application compiler 204 then compiles each modified program 210 into executable application code 212. After the compilation, the application is ready for the fault injection runs that are used to compute a plurality of operator characterization metrics.

In one embodiment, the application compiler 204 outputs the executable application code 212 to the testing module 214. The testing module 214 evaluates the results of the injected faults on the executable application code 212 in accordance with the operator characterization metrics. Based on the testing module's evaluation, the testing module 214 outputs results indicating the adequacy of a given fault tolerance policy for the target application.

Figure 3:
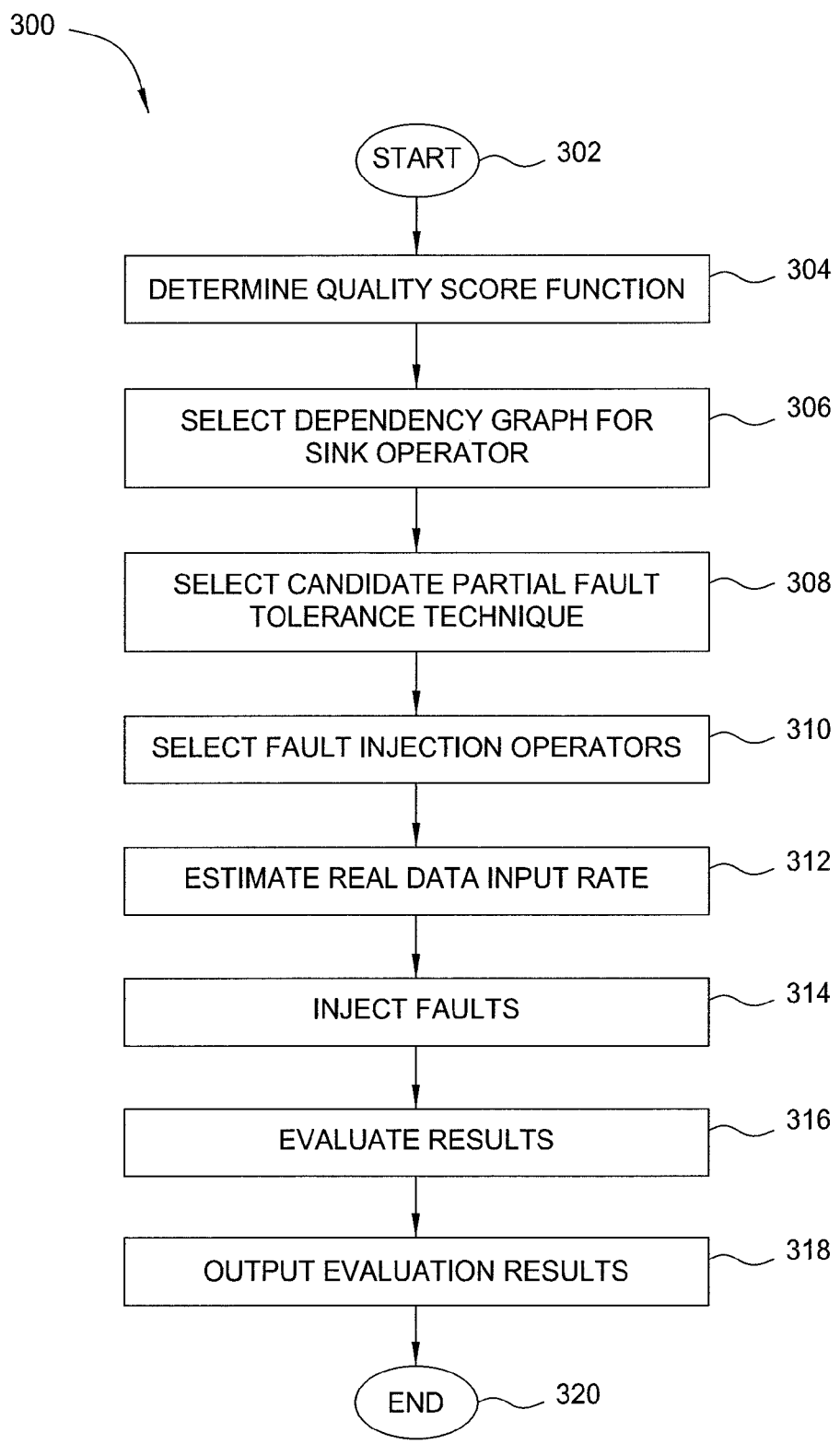
FIG. 3 is a flow diagram illustrating one embodiment of a method for designing a resource-efficient, fault-tolerant streaming application, according to the present invention.

FIG. 3 is a flow diagram illustrating one embodiment of a method 300 for designing a resource-efficient, fault-tolerant streaming application, according to the present invention. In one embodiment, the method 300 is applied for each sink of a target application. The method 300 may be implemented, for example, by the system 200 illustrated in FIG. 2. As such, reference is made in the discussion of the method 300 to various components of the system 200. It will be appreciated, however, that the method 300 is not limited by the configuration illustrated in FIG. 2 and may, in fact, be implemented in systems having alternative configurations.

The method 300 is initialized at step 302 and proceeds to step 304, where the tester determines a quality score function via the testing module 214. The quality score function (or "QSF") is application-specific and expresses how well the application is performing (e.g., the total number of detected alerts, the average of statistical prediction accuracy for a manufacturing production pipeline, total profit accumulated over a period of time, etc.). Methods for calculating the QSF are discussed in greater detail below.

In step 306, the testing module 214 selects the dependency graph for the target sink operator. In one embodiment, only stream operators on the dependency graph of the target sink operator are subject to fault injections. In FIG. 1, the stream operators 102 on the dependency graph of the sink operator $102_{10}$ are indicated by shaded boxes.

In step 308, the testing module 214 selects a candidate partial fault tolerance technique or policy and its corresponding fault model. For example, an application developer may decide that only a subset of the stream operators in a stream processing application should be replicated. Depending on the application reliability requirements, the application developer may deem a specific technique as the most adequate for a set of objectives. Based on the chosen technique, the corresponding fault effects are selected as the fault model for the fault injection experimentation.

In step 310, the testing module 214 selects the fault injection target operators. In one embodiment, selection of the target operators is conditioned on the chosen fault model; only certain operators may be selected and subjected to fault injection according to a given fault model.

In step 312, the testing module 214 estimates a real data input rate for the stream sources. An estimate of the real data input rate helps to realistically emulate a fault when compared to a fault hitting the application in the field.

In step 314, the pre-processor 202 and application compiler 204 configure the application to inject faults at different stream offsets from the beginning of the input stream and with distinct outage durations, as discussed above. In a streaming application, stream operators execute the same set of instructions over different input tuples. In this context, injecting faults at different stream offsets means that the faults affect the target operator when processing a different set of input tuples. Emulating different outage durations helps to assess how the recovery time affects the application output quality.

In step 316, the testing module 214 evaluates the results of the fault injection. Each operator is characterized by a plurality of metrics that characterize the application in terms of predictability and availability under faults. In one embodiment, each operator is characterized by four metrics: outage duration impact, data dependency, quality impact, and recovery time. With these metrics, it is possible to evaluate whether the partial fault tolerance technique chosen is adequate for the target application. Furthermore, these metrics can be used to compare the impact of the same fault in different stream operators, so that resources available for fault tolerance can be prioritized to operators that affect the application output quality the most.

In step 318, the testing module 214 outputs its results indicating the adequacy of the chosen partial fault tolerance technique for the target application. The method 300 then terminates in step 320.

Figures 4A, 4B:
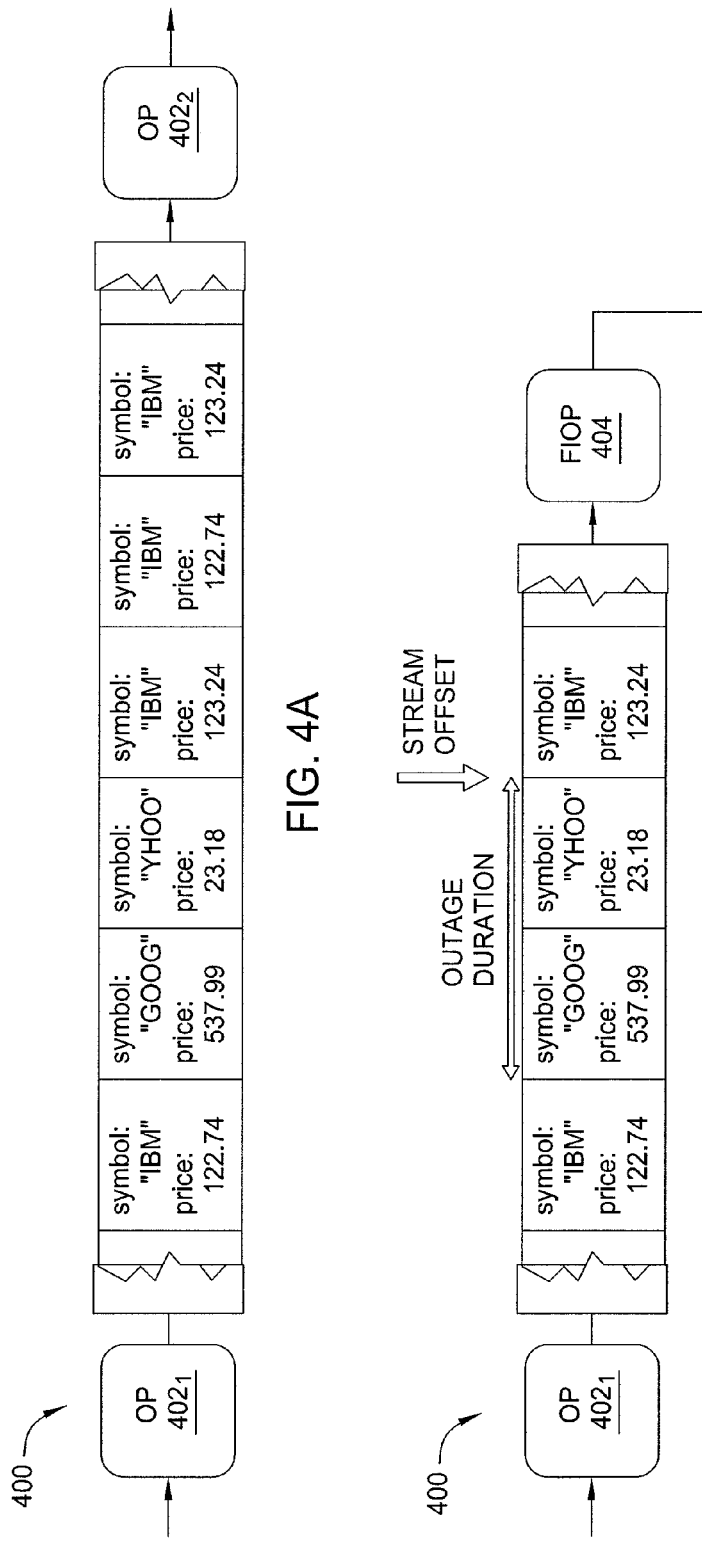
FIG. 4A is a schematic diagram illustrating a section of an exemplary stream processing application.
FIG. 4B is a schematic diagram illustrating an exemplary runtime instantiation of a fault injection operator in the application 400 of FIG. 4A, according to the present invention.

FIG. 4A is a schematic diagram illustrating a section of an exemplary stream processing application 400. Specifically, FIG. 4A illustrates operation of this section of the stream processing application under fault-free conditions. As illustrated, a first operator $402_1$ sends a data stream comprising a plurality of tuples, where the tuples contain both a stock symbol and the corresponding stock price, to a second operator $402_2$.

FIG. 4B is a schematic diagram illustrating an exemplary runtime instantiation of a fault injection operator in the application 400 of FIG. 4A, according to the present invention. In particular, FIG. 4B illustrates the injection of the bursty tuple loss fault model into the second operator $402_2$. After the fault injection framework pre-processing and recompilation phase (as discussed in connection with FIG. 2), the first operator $402_1$ connects to the FIOP 404, which connects to the second operator $402_2$. The bursty tuple loss operator (i.e., FIOP 404) is placed right before the target operator (i.e., second operator $402_2$) and receives two parameters. The first parameter is the outage duration, specified in one embodiment in terms of the number of tuples lost. The second parameter is the stream offset point, specified in one embodiment in terms of the number of tuples processed by the target operator $402_2$ up until the fault.

In FIG. 4B, the FIOP 404 triggers a fault after processing the stock symbol IBM with a price of USD 123.24. The duration of the fault is two tuples, which makes the FIOP 404 drop the tuples with stock symbols YHOO and GOOG. After the FIOP 404 drops the number of tuples specified in the duration, the operation of the FIOP 404 reverts to a non-faulty behavior (i.e., forwarding tuples received by the first operator $402_1$ to the second operator $402_2$). FIG. 4B depicts the FIOP 404 for a target operator that receives a single stream and has one input port. For stream operators with two or more ports, a different version of the FIOP 404 with the equivalent number of ports is required.

To learn how the application behaves under faults in the worst case, faults must be injected into all operators that make up an application. However, stream processing applications can have an arbitrary number of stream operators. To reduce the number of required fault injection targets when evaluating the behavior of an application under faults, the method employed by one embodiment of the fault injection framework includes pre-analyzing the application's data flow graph. Only those operators whose failure can manifest the failure type captured by the fault model (e.g., tuple reordering does not manifest itself when operators with only one input stream fail) are selected as injection targets.

For the bursty tuple loss fault model discussed above, the inspection of the data flow graph starts by selecting all source operators as fault injection targets. Injecting faults into the sources mimics a fault that affects the stream feed that originates from outside of the stream processing middleware (e.g., the raw sensor data feed) or from the source operator itself.

Figure 5C:
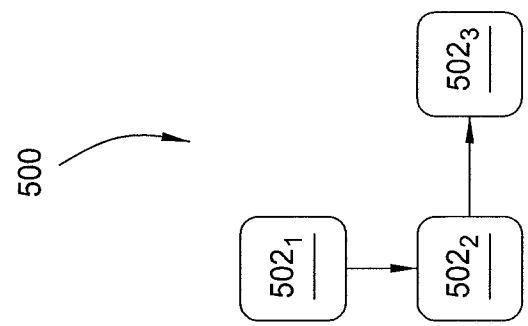
FIGS. 5A-5C illustrate scenarios for placement of fault injection operators that implement a bursty tuple loss fault model.
Figure 5B:
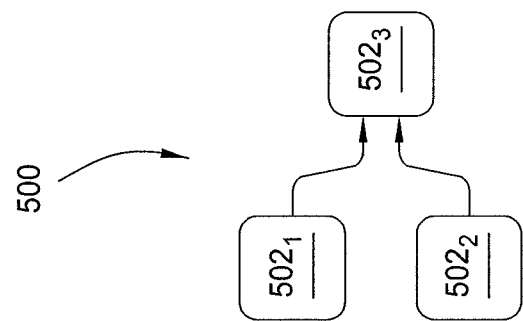
Figure 5A:
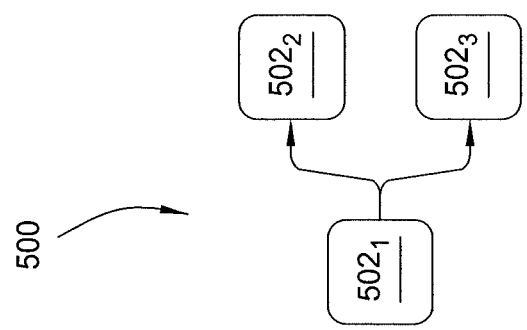

From each source operator, the analysis continues to all downstream operators by doing a breadth-first traversal, until the sink operator is reached. The framework selects a given operator as a target if its position in the data flow graph meets any of the following three properties:

1. An operator upstream from the given operator produces more than one output stream. A common pattern in streaming applications is for one operator to have its outputs consumed by more than one downstream operator. FIGS. 5A-5C illustrate scenarios for placement of fault injection operators that implement a bursty tuple loss fault model. In particular, FIG. 5A is a data flow graph illustrating a first exemplary scenario for placement of fault injection operators that implement a bursty tuple loss fault model. As illustrated, both the second operator $502_2$ and the third operator $502_3$ consume the stream produced by the first operator $502_1$. If the first operator $502_1$ fails, part of its input stream is lost, which affects both the second operator $502_2$ and the third operator $502_3$. If the second operator $502_2$ fails, the first operator $502_1$ can continue to send data to the third operator $502_3$, but all data sent to the second operator $502_2$ while the second operator $502_2$ is offline is lost. These two different scenarios can impact the application output in different ways. Therefore, both scenarios should be emulated when evaluating the application behavior under faults.

2. The given operator consumes more than one input stream. Stream operators can consume data transported by multiple streams and produced by more than one upstream operator. One such example is the join operator. A join operator correlates events coming from two different streams according to a predicate. FIG. 5B is a data flow graph illustrating a second exemplary scenario for placement of fault injection operators that implement a bursty tuple loss fault model. In this scenario, where the first operator $502_1$ and the second operator $502_2$ send data to the third operator $502_3$. If the first operator $502_1$ fails, the third operator $502_3$ stops receiving data from one of its input ports, but it continues to process data coming from the second operator $502_2$. If the third operator $502_3$ fails, data sent by both the first operator $502_1$ and the second operator $502_2$ is lost. Since these two scenarios represent two different error modes, both scenarios must be emulated during the fault injection experiments.

3. An operator upstream from the given operator is stateful. A stream operator can either be stateful or stateless. For example, an operator that filters a stream based on the attributes of the current tuple does not keep any state related to previously processed tuples. FIG. 5C is a data flow graph illustrating a third exemplary scenario for placement of fault injection operators that implement a bursty tuple loss fault model. In this scenario, a first, stateless operator $502_1$ sends data to a second, stateful operator $502_2$, which sends data to the third operator $502_3$. If the first operator $502_1$ fails, the first operator $502_1$ loses input data from its upstream operator while offline. As a result, the second operator $502_2$ also does not receive input data while the first operator $502_1$ is offline, and the second operator $502_2$ does not update its internal state. If the second operator $502_2$ fails, the behavior is equivalent to a fault in the first operator $502_1$. The second operator $502_2$ loses its input data and does not update its internal state while it is recovering. However, the error behavior changes when the third operator $502_3$ fails. The third operator $502_3$ loses its input data, but the second operator $502_2$ still updates its internal state. Once the third operator $502_3$ is back up, the second operator $502_2$ is ready to send up-to-date information and does not spend any time rebuilding its internal state. These scenarios have different impact on the application output, and both scenarios must be evaluated.

If the fault injection framework does not select an operator as a fault injection target, then the fault injection framework assumes an operator's error behavior with respect to the output quality is the same as the behavior of its upstream operator.

Evaluating the outcome of a fault injection experiment in a stream processing application poses many challenges. Streaming applications may be non-deterministic, as they typically can tolerate approximate answers. As a result, embodiments of the invention consider how close the faulty output is to the fault-free run (referred to herein as the "golden run"), and if such behavior is acceptable according to the application semantics. Once the goodness of the application output can be assessed, the metrics that characterize the application behavior when a fault affects a single operator can be computed. With such metrics in hand, an application developer can compare the impact of faults on different operators, and distinguish which operators are the most critical for the application to maintain quality of service.

The quality score function (QSF) computes a score value over the output produced by the application. The QSF expresses the goodness of the output and is application-specific. Thus, depending on the application, the QSF may be the summation, the average, the mean squared, or the error of the output values. The QSF is designed to provide an application developer with a clear quantitative understanding of the impact of faults on an application. The QSF represents how the application performs end-to-end, since this the QSF uses the application output as its domain. This allows comparison of the quality impact of different operators based on a common reference point (i.e., the golden run) according to the teachings of the present invention.

As an example, consider a streaming application that implements an Intrusion Detection System (IDS) and generates an alert every time the application detects an attempt to compromise the computer system under surveillance. A possible QSF for this application is the total number of detected attacks during an observation time period in relation to the ground truth (i.e., the real observation). The QSF is a measure of how well this application performs, and the QSF can be computed regardless of which stream operators are faulty.

Stream processing applications typically produce output results continuously. If the output is not carefully analyzed, non-determinism can be confused with the effects of a fault. This can lead to an overestimation of the effects of failures. In one embodiment, this problem is solved by limiting the segments of the continuous output stream that are analyzed for estimating the impact of failures on the results. For example, results produced before the fault injection are ignored in the metric computation. The metrics of outage duration impact and data dependency consider such focused segments of the stream for their computations.

Continuous output can also mask the effects of real faults. Consider the case where the QSF is the total number of alerts detected by an IDS. A possible manifestation of the fault is for the application to initially miss x alerts and to later misdetect y alerts. When applying the QSF, the misdetected alerts compensate for the missed ones, which may erroneously lead an application developer to think that the fault had little impact on the application output. The likelihood of this problem occurring is minimized in one embodiment by computing the QSF over local sections of the output stream instead of computing the QSF once over the complete output set. The metrics of quality impact and recovery time use local computation of the QSF. These metrics allow an application developer to assess which operators are more critical for the application to preserve quality of service under faults.

The outage duration impact metric ($C^{oq}$) is assessed by computing a correlation coefficient between outage duration and quality degradation. If the quality degradation and the outage duration are highly correlated (i.e., the correlation coefficient is close to one or negative one), then an application developer can use curve fitting methods (e.g., least square errors) to find a function that describes the quality loss given specific failure profiles. The application developer can feed this function with outage parameters extracted from real failures in the field and evaluate the risk of using the evaluated partial fault tolerance technique. If such behavior poses high risk to the application, the operator should be protected against faults.

When an operator has a high $C^{oq}$, decreasing the outage duration can directly impact the application quality. For example, if checkpointing is used by the operator, the outage duration can be decreased by reducing the detection latency of a fault detector.

In one embodiment, the correlation coefficient between outage duration and quality degradation is computed as follows. A fault injection test for a single operator injects faults at m different stream offsets using n different outage durations. Each stream offset is referred to as $SO_i$, where $i \in [1, \ldots, m]$, and each outage duration is referred to as $OD_j$, where $j \in [1, \ldots, n]$. For each $SO_i$ and $OD_j$, there are p repetitions, where each repetition generates a stream output in which only one section is affected by the injected fault. The affected section of the stream is estimated based on the $SO_i$ d the maximum $OD_j$ value.

In one embodiment, the average quality score function $\overline{QSF_{i,j}}$ or each $OD_j$ in a single $SO_i$ is computed as:

$$\overline{QSF_{i,j}} = \frac{\sum_{k=1}^{p} RQ_{i,j,k}}{p} \quad \text{(Equation 1)}$$

After computation of the average quality score function, a stream offset $SO_i$ is associated with n $OD_j$ values and their corresponding $\overline{QSF_{i,j}}$ results. With these two sets of data, the Spearman's rank correlation coefficient can be computed, providing an assessment of whether two sets of values have a monotonic relationship. Computation of the Spearman's rank correlation coefficient results in each stream offset $SO_i$ having one correlation coefficient $CC_i$. The outage duration impact metric $C^{oq}$ is then calculated as:

$$C^{oq} = \frac{\sum_{i=1}^{n} CC_i}{m} \quad \text{(Equation 2)}$$

The data dependency metric ($\sigma^q$) is the quality standard deviation under different stream offsets. The data dependency metric evaluates how the same fault (i.e., the same fault model used with the same outage duration) affects the output quality when injected at different stream offsets. A high variability in the application output quality under the same fault indicates high data dependency (i.e., the impact on the output depends highly on the data being affected by the fault). In one embodiment, an operator with a high data dependency metric $\sigma^q$ is not a good candidate for partial fault tolerance, since the result of a fault in the field is highly unpredictable. An operator with low $\sigma^q$ indicates that the fault has a substantially predictable impact in output quality, regardless of where the fault was injected.

If the impact on quality is within error bounds according to the application semantics, then the corresponding operator is a good candidate for partial fault tolerance.

The computation of the data dependency metric $\sigma^q$ is similar to the computation of the outage duration impact metric $C^{oq}$. One difference is that when computing $\sigma^q$, the same fixed $OD_j$ value is chosen for each $SO_i$, instead of considering all $OD_j$ values. As before, the result of a fault injection test is the QSF computed over the faulty section of the stream output.

For each stream offset $SO_i$ and chosen outage duration, the average $\overline{QSF_i}$ is calculated as in Equation 1. The calculated value is then normalized with the average QSF computed for the golden run. The normalization makes it possible to accurately assess how the effects on the QSFs vary under faults. The QSF of the golden run is calculated over the section of the output stream affected by the fault. The golden run is executed q times, where each execution generates one random variable $GQ_{i,1}$, where $1 \in [1, \ldots, q]$. The normalized average is referred as $NQ_i$ and is computed in one embodiment as:

$$NQ_i = \frac{\overline{QSF_i}}{\left(\sum_{l=1}^{q} GQ_{i,l}\right)/q} \quad \text{(Equation 3)}$$

The data dependency metric $\sigma^q$ is then calculated with the formula for standard deviation, below (Equation 4) and using the normalized average $NQ_i$ of each stream offset $SO_i$ as data points. Thus, in one embodiment, the data dependency metric $\sigma^q$ is calculated as:

$$\sigma^q = \sqrt{\frac{1}{m} \sum_{i=1}^{m} (NQ_i - \overline{NQ})^2} \quad \text{(Equation 4)}$$

where $\overline{NQ}$ is the average of the normalized average $NQ_i$ of all stream offsets $SO_i$.

The quality impact metric ($I^{iq}$) is the sum of squared errors (SSE) of local quality, which allows a comparison of the fault impact of different operators on the application output quality. As previously discussed, the continuous output of the streaming application may mask the faulty effects. To compensate for this, the quality impact metric assesses the deviation of the application output quality locally (e.g., by computing the QSF over different intervals of the output stream). The magnitude of the fault impact is obtained by summing up the squares of all local errors throughout the application execution after the injection. The local errors of each output stream interval are obtained by comparing the faulty QSF value with the QSF value of the same output stream interval of the golden run.

Among the injected faults, the trial run with the maximum SSE value is selected. The reason for this is that it is unknown exactly how the fault will manifest in the field, so picking the maximum allows an assessment of the risk by considering the worst case manifested during experimentation.

To compute the quality impact metric $I^{iq}$, the same single outage duration $OD_j$ is chosen for all stream offsets $SO_i$, similarly to the computation of the data dependency metric $\sigma^q$. Each experiment trial k generates one output stream, which is divided into s sections. For each section, the local QSF is computed and is referred to as $LQ_{i,k,t}$, where $t \in [1, \ldots, s]$. The average of $LQ_{i,k,t}$ over each experiment trial is referred as $\overline{LQ_{i,t}}$ and is computed similarly to Equation 1. A similar procedure is performed for each of the q trials of the golden run. The computation of the QSF for each section of the golden output stream is referred as $GLQ_{i,l,t}$. The average of $GLQ_{i,l,t}$ over each trial is referred to as $\overline{GLQ_{i,t}}$ and is calculated similarly to Equation 1.

Next, the SSE is calculated for each $SO_i$. The SSE of a single $SO_i$ is referred as $I_i^{lq}$ and is computed as:

$$I_i^{lq} = \sum_{t=S_{begin}}^{s} \left( \frac{\overline{LQ_{i,t}} - \overline{GLQ_{i,t}}}{\overline{GLQ_{i,t}}} \right)^2 \quad \text{(Equation 5)}$$

where $S_{begin}$ is the section of the output stream produced after the fault injection run and $(\overline{LQ_{i,t}} - \overline{GLQ_{i,t}})/\overline{GLQ_{i,t}}$ is the output error caused by the fault divided by the golden run's QSF. The metric result is the maximum value among the $I_i^{lq}$ computed for each $SO_i$.

Figures 6A, 6B, 6C:
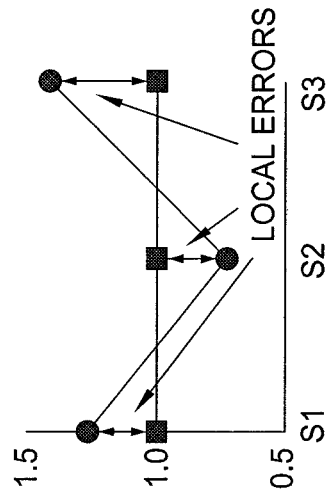
FIGS. 6A-C illustrate one example of how to perform local quality score function computations over the output stream and compute the local error.

FIGS. 6A-C illustrate one example of how to perform local QSF computations over the output stream and compute the local error. Specifically, FIG. 6A is a chart illustrating an operator's output stream of the golden run, in which each output tuple has a key and a value. FIG. 6B is a chart illustrating the output stream of a faulty run. The faulty output has the same tuple attributes as the golden run, but the values associated with each key are erroneous. In FIG. 6A and FIG. 6B, both output streams are divided into three different sections (S1, S2, and S3). The QSF considers the summation of the value attribute and is applied locally to each section. FIG. 6C is a graph illustrating the local error (circle marker) in relation to the golden run (square marker) for each of the output stream sections. The arrows connecting the faulty QSF values and the golden run's QSF values illustrate each local error.

The recovery time metric ($R^{lq}$) is a percentile (e.g., ninetieth percentile) of the quality score function results that are outside a threshold value. The recovery time metric estimates how long it takes for the application to recover and to start producing normal output after the occurrence of a fault. The higher the value of the recovery time metric, the higher the impact of an operator failure in the application availability. Similarly to the quality impact metric $I^{lq}$, local observations of the QSF and the maximum value obtained from injecting faults at different stream offsets are considered. In one embodiment, a QSF data point is considered normal when the difference between the faulty QSF and the golden QSF is less than a certain threshold (e.g., the faulty QSF value is less than two percent away from the golden run's QSF value). Any difference greater than the threshold is considered to be an erroneous output. It is noted that both the threshold and the percentile are inputs to the method described in this embodiment. Other values for these variables are possible.

The recovery time metric is computed in a manner similar to the quality impact metric $I^{lq}$. However, where the SSE is calculated (in accordance with Equation 5) for the quality impact metric $I^{lq}$, a different computation is performed for the recovery time metric. First, an error array based on $\overline{LQ_{i,t}}$ and $\overline{GLQ_{i,t}}$ is built, with t starting at $S_{begin}$. Each position of the array is referred as $EQ_{i,u}$, where $u \in [1, \ldots, s-S_{begin}]$, and is computed as:

$$EQ_{i,u} = \frac{|\overline{LQ_{i,t}} - \overline{GLQ_{i,t}}|}{\overline{GLQ_{i,t}}} \quad \text{(Equation 6)}$$

For each position u in the error array, the number of error values that are greater than the established threshold up until and including $u^{th}$ error value $EQ_{i,u}$. This is denoted by $NE_{i,u}$ and is represented formally as:

$$NE_{i,u} = \sum_{v=1}^{u} 1[EQ_{i,v} > \text{threshold}] \quad \text{(Equation 7)}$$

Next, the index $R_i^{lq}$, where a percentage p (e.g., 90%) of the erroneous QSF observations fall, is computed as:

$R_i^{lq} = \min u$ such that $NE_{i,u} \geq p * NE_{i,s-S_{begin}}$ \quad (Equation 8)

Finally, the maximum index for all stream offsets $SO_i$, that is $R^{lq} = \max_i R_i^{lq}$, is obtained. The percentile p should be chosen as to cover most of the erroneous outputs (e.g., p=0.90). The recovery time metric considers most of the errors due to the finite input stream processed during a fault injection experimental trial.

Figure 7:
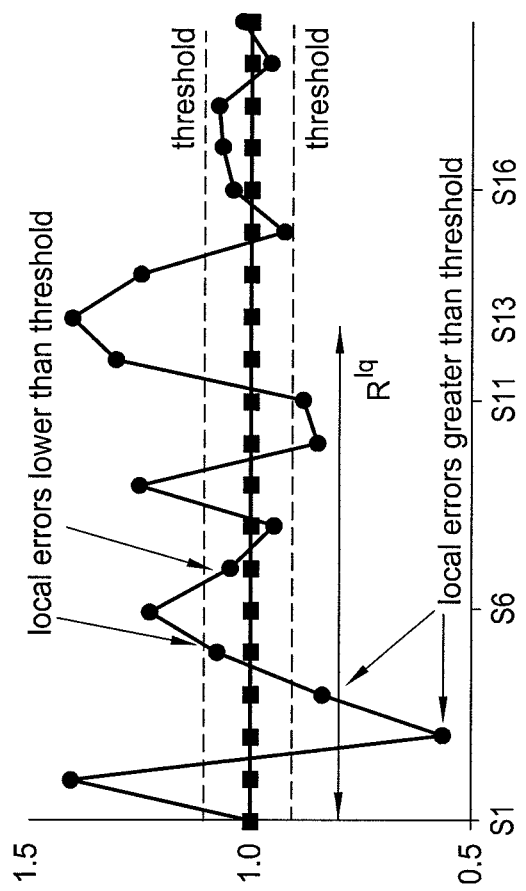
FIG. 7 is a graph illustrating an example of the recovery time metric.

FIG. 7 is a graph illustrating an example of the recovery time metric $R^{lq}$. Like FIG. 6C, the curve with a circle marker shows the normalized local error in relation to the golden run (square marker) for each section of the output stream. The dashed line shows the allowed error threshold. The allowed error threshold indicates the tolerance to errors of the output score functions values when compared to the golden output score values. The arrow illustrates the coverage of p percent of the faulty output score function observations that lie outside of the threshold tolerance. In FIG. 7, the arrow illustrates the coverage for a percentile p that is equal to 90%, which covers the erroneous outputs up to S13. The recovery time metric $R^{lq}$ covers ninety percent of the data points that lie outside the threshold values after the fault is injected, showing an approximation of how long the application takes to stabilize its output after a fault.

Figure 8:
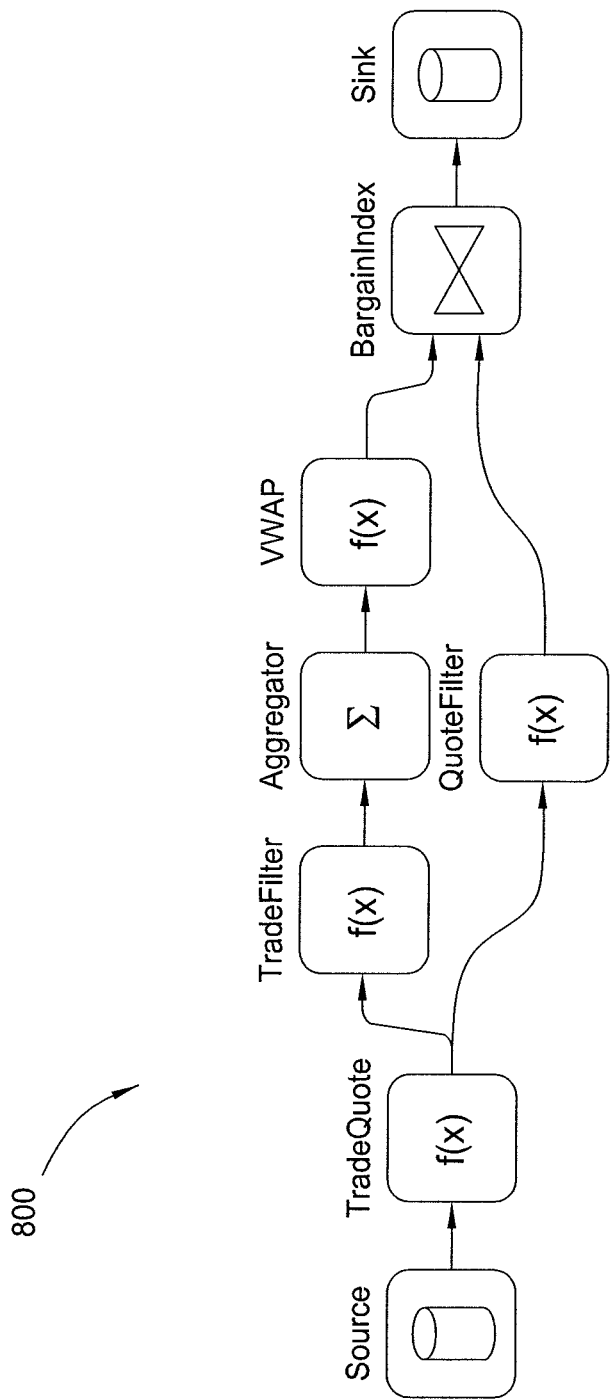
FIG. 8 is a schematic diagram illustrating a sample stream processing application with which the bursty tuple loss fault model can be applied.

FIG. 8 is a schematic diagram illustrating a sample stream processing application 800 with which the above-described bursty tuple loss fault model can be applied. The application 800 processes stock trades and quotes and outputs information about all stocks for which there is a potential profit in buying the stock at a given time. The application contains eight stream operators: Source, TradeQuote, TradeFilter, Aggregator, VWAP, QuoteFilter, BargainIndex, and Sink. Only Source, TradeFilter, VWAP, QuoteFilter, and BargainIndex are chosen as fault injection targets when a bursty tuple loss fault model is considered according to the teaching of this invention.

According to embodiments of the present invention, the following set of parameters is chosen: a specific data input stream, injection stream offsets from the beginning of the data input stream, outage durations, incoming data rates, a quality score function (QSF), the size of the interval for local observations of QSF, an error tolerance threshold for local observations of the QSF, and a percentage p to estimate the application recovery time. After that, many fault injection experimental trials are performed according to the chosen parameters. Finally, a set of metrics (e.g., an outage duration impact metric, a data dependency metric, a quality impact metric, and/or a recovery time metric) is computed for each of the target operators based on the application outputs produced by the experimental trials. FIG. 9 is a chart illustrating sample values for each of the four metrics computed for several of the operators illustrated in FIG. 8.

The sample values show, for example, that the TradeFilter operator has a high data dependency metric value relative to the other operators. This indicates that the impact of a fault on the application output depends to a great degree on what data the outage actually affects. As a result, the fault tolerance technique that was emulated during the experimental trials is not adequate to protect the TradeFilter operator against faults. The sample values also show that the TradeFilter and Source operators have high quality impact and recovery time metrics. The sample values also show that QuoteFilter and BargainIndex operators have low values for quality impact and recovery time metrics. This indicates that TradeFilter and Source operators should be prioritized when deploying fault tolerance techniques. In addition, according to the application semantics and its tolerance to errors, the application output is not significantly affected when the QuoteFilter and BargainIndex operators are under failure. This means that no additional resources for fault tolerance are required for these operators.

Figure 10:
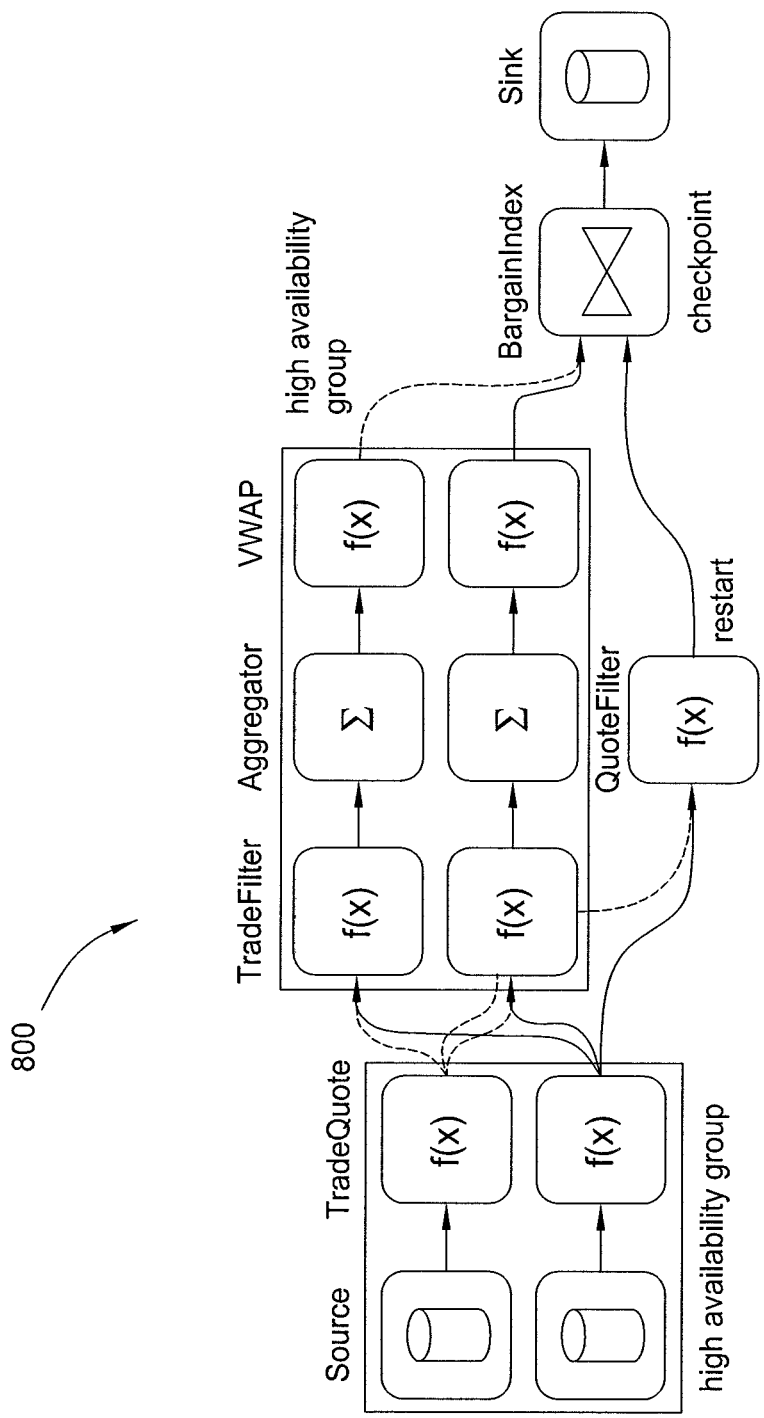
FIG. 10 is a schematic diagram illustrating one possible fault tolerance policy reconfiguration of the application illustrated in FIG. 8, according to the present invention.

FIG. 10 is a schematic diagram illustrating one possible fault tolerance policy reconfiguration of the application 800 illustrated in FIG. 8, according to the present invention. Specifically, the fault tolerance policy reconfiguration has been computed in accordance with embodiments of the present invention, where a replication policy is added to the following operators of the application 800: Source, TradeQuote, TradeFilter, Aggregator, and VWAP. The reconfiguration considers the application of a new fault tolerance policy that is more suited to the application. The reconfiguration prioritizes the operators with highest values of the data dependency, quality impact, and recovery time metrics, according to the sample values shown in FIG. 9.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable medium(s) having computer readable program code embodied thereon.

Any combination of one or more computer readable medium(s) may be utilized. The non-transitory computer readable medium may be, for example, a computer readable storage medium. Exemplary computer readable storage mediva include, but are not limited to: an electronic, magnetic, optical, electromagnetic, infrared, or semiconductor system, apparatus, or device, or any suitable combination of the foregoing. More specific examples of the computer readable storage medium include, but are not limited to: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of the present invention may be written in any combination of one or more programming languages, including an object oriented programming language such as the JAVA programming language, the SMALLTALK programming language, the C++ programming language, or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the last scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
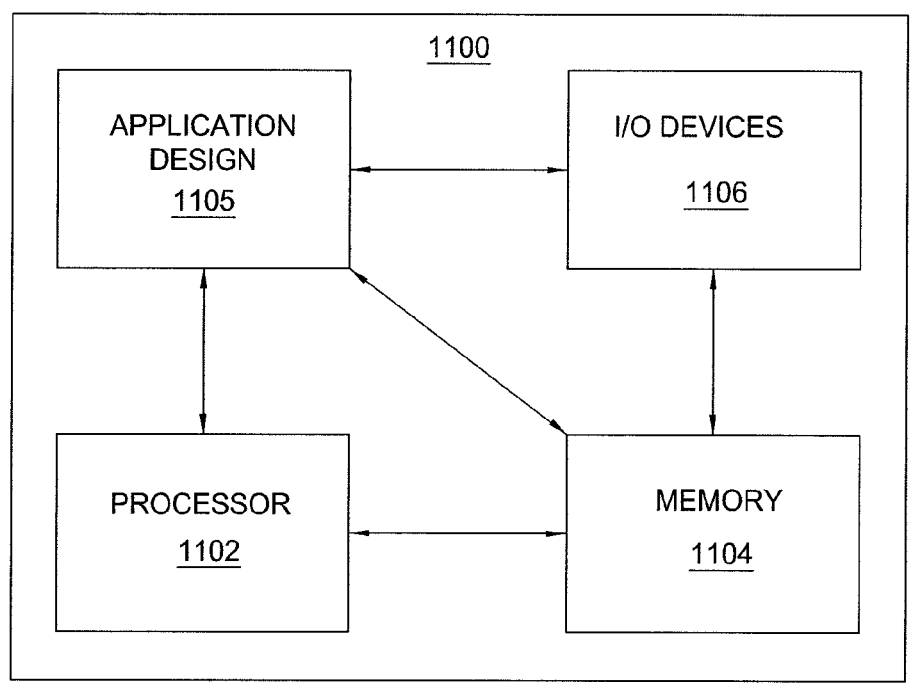
FIG. 11 is a high-level block diagram of the present invention that is implemented using a general purpose computing device.

For example, FIG. 11 is a high-level block diagram of the present invention that is implemented using a general purpose computing device 1100. In one embodiment, a general purpose computing device 1100 comprises a processor 1102, a memory 1104, an application design module 1105 and various input/output (I/O) devices 1106 such as a display, a keyboard, a mouse, a stylus, a wireless network access card, and the like. In one embodiment, at least one I/O device is a storage device (e.g., a disk drive, an optical disk drive, a floppy disk drive, an application design tool, and/or a test pattern generation tool). It should be understood that the application design module 1105 can be implemented as a physical device or subsystem that is coupled to a processor through a communication channel.

Alternatively, as discussed above, the application design module 1105 can be represented by one or more software applications (or even a combination of software and hardware, e.g., using Application Specific Integrated Circuits (ASIC)), where the software is loaded from a storage medium (e.g., I/O devices 1106) and operated by the processor 1102 in the memory 1104 of the general purpose computing device 1100. Thus, in one embodiment, the application design module 1105 for designing resource-efficient, fault tolerant streaming applications, as described herein with reference to the preceding Figures, can be stored on a computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the Figures, and as such these terms may be interchangeable.

What is claimed is:

1. A method for implementing partial fault tolerance in a stream processing application comprising a plurality of stream operators, the method comprising:
    defining a quality score function that expresses how well the application is performing quantitatively;
    injecting a fault into at least one of the plurality of operators;
    assessing an impact of the fault on the quality score function based on an analysis of local sections of an output stream of the application including the fault, wherein each local section comprises a portion of the output stream of the application during a defined time interval; and
    selecting at least one partial fault-tolerant technique for implementation in the application based on the assessing.

2. The method of claim 1, wherein the injecting comprises:
    modifying source code for the application to produce at least one instance of modified source code, where the at least one instance of modified source code incorporates a fault injection parameter for the at least one partial fault tolerance technique; and
    compiling the at least one instance of modified source code into executable code.

3. The method of claim 1, wherein the assessing comprises:
    calculating the quality score function using the output stream of the application in a fault-free condition to generate a target quality score function;
    calculating the quality score function using the local sections of the output stream of the application including the fault to generate a faulty quality score function; and
    determining whether a difference between the faulty quality score function and the target quality score function is within a tolerance threshold.

4. The method of claim 1, wherein the quality score function accounts for at least one metric specific to the at least one of the plurality of operators, and wherein the at least one metric characterizes the application in terms of effect on predictability and availability under a failure.

5. The method of claim 4, wherein the at least one metric comprises an outage duration metric that correlates a duration of an outage of the at least one operator with a degradation in quality of the output stream of the application.

6. The method of claim 4, wherein the at least one metric comprises a data dependency level metric that defines how the fault affects a quality of the output stream of the application when injected at different stream offsets.

7. The method of claim 4, wherein the at least one metric comprises a quality impact metric that defines a deviation of a quality of the output stream of the application over the local sections of the output stream.

8. The method of claim 4, wherein the at least one metric comprises a recovery time metric that estimates how long it takes the application to recover after occurrence of the fault.

9. The method of claim 1, wherein the fault is injected at different stream offsets and with different outage durations.

10. The method of claim 1, wherein the assessing comprises:
    aggregating over a totality of the output stream measures of errors occurring in the local sections.

11. The method of claim 10, wherein each of the measures comprises a square of the errors occurring in one of the local sections.

12. The method of claim 11, wherein the aggregating comprises:
    summing the measures.

13. The method of claim 1, wherein each of the local sections comprises less than an entirety of the output stream.

14. An article of manufacture, comprising:
    a non-transitory computer readable storage medium containing an executable program for implementing partial fault tolerance in a stream processing application comprising a plurality of stream operators, where the program performs steps comprising:
        defining a quality score function that expresses how well the application is performing quantitatively;
        injecting a fault into at least one of the plurality of operators;
        assessing an impact of the fault on the quality score function based on an analysis of local sections of an output stream of the application including the fault, wherein each local section comprises a portion of the output stream of the application during a defined time interval; and
        selecting at least one partial fault-tolerant technique for implementation in the application based on the assessing.

15. The article of manufacture of claim 14, wherein the injecting comprises:
    modifying source code for the application to produce at least one instance of modified source code, where the at least one instance of modified source code incorporates a fault injection parameter for the at least one partial fault tolerance technique; and
    compiling the at least one instance of modified source code into executable code.

16. The article of manufacture of claim 14, wherein the assessing comprises:
    calculating the quality score function using the output stream of the application in a fault-free condition to generate a target quality score function;

calculating the quality score function using the local sections of the output stream of the application including the fault to generate a faulty quality score function; and determining whether a difference between the faulty quality score function and the target quality score function is within a tolerance threshold.

17. The article of manufacture of claim 14, wherein the quality score function accounts for at least one metric specific to the at least one of the plurality of operators, and wherein the at least one metric characterizes the application in terms of effect on predictability and availability under a failure.

18. The article of manufacture of claim 17, wherein the at least one metric comprises an outage duration metric that correlates a duration of an outage of the at least one operator with a degradation in quality of the output stream of the application.

19. The article of manufacture of claim 17, wherein the at least one metric comprises a data dependency level metric that defines how the fault affects a quality of the output stream of the application when injected at different stream offsets.

20. The article of manufacture of claim 17, wherein the at least one metric comprises a quality impact metric that defines a deviation of a quality of the output stream of the application over the local sections of the output stream.

21. The article of manufacture of claim 17, wherein the at least one metric comprises a recovery time metric that estimates how long it takes the application to recover after occurrence of the fault.

22. The article of manufacture of claim 14, wherein the fault is injected at different stream offsets and with different outage durations.

23. A system for implementing partial fault tolerance in a stream processing application comprising a plurality of stream operators, the system comprising:

a hardware processor; and a non-transitory computer-readable medium containing an executable program which, when executed by the hardware processor, cause the hardware processor to implement:

a pre-processor that receives as inputs: source code for the application, a target stream operator that is one of the plurality of stream operators and at which a fault is to be injected, a fault model corresponding to a partial fault tolerance technique, and a plurality of injection parameters for the partial fault tolerance technique, wherein the pre-processor produces as output a plurality of instances of modified source code for the application, each of the plurality of instances of modified source code incorporating a different one of the plurality of injection parameters;

an application compiler coupled to the output of the pre-processor, where the application compiler produces as output executable code for each of the plurality of instances of modified source code; and a testing module coupled to the pre-processor of the application compiler, where the testing module receives as input the executable code for each of the plurality of instances of modified source code and produces as output an assessment of an adequacy of the partial fault tolerance technique for the application based on an analysis of local sections of an output stream of the application including the fault, herein each local section comprises a portion of the output stream of the application during a defined time interval.

* * * * *